US012316775B2

(12) United States Patent
Groth

(10) Patent No.: US 12,316,775 B2
(45) Date of Patent: May 27, 2025

(54) MULTI-PARTY COMPUTATIONS IN A DISTRIBUTED NETWORK

(71) Applicant: DFINITY STIFTUNG, Zürich (CH)

(72) Inventor: Jens Groth, Zürich (CH)

(73) Assignee: DFINITY STIFTUNG, Zürich (CH)

( * ) Notice: Subject to any disclaimer, the term of this patent is extended or adjusted under 35 U.S.C. 154(b) by 87 days.

(21) Appl. No.: 18/280,902

(22) PCT Filed: Mar. 10, 2021

(86) PCT No.: PCT/EP2021/056003
§ 371 (c)(1),
(2) Date: Sep. 7, 2023

(87) PCT Pub. No.: WO2022/188963
PCT Pub. Date: Sep. 15, 2022

(65) Prior Publication Data
US 2024/0154820 A1 May 9, 2024

(51) Int. Cl.
*H04L 9/32* (2006.01)
*H04L 9/00* (2022.01)

(52) U.S. Cl.
CPC ............ *H04L 9/3255* (2013.01); *H04L 9/006* (2013.01); *H04L 9/3252* (2013.01); *H04L 2209/46* (2013.01)

(58) Field of Classification Search
CPC ....... H04L 9/3255; H04L 9/3252; H04L 9/50; H04L 2209/46
See application file for complete search history.

(56) References Cited

PUBLICATIONS

Alin Tomescu et al., "Towards Scalable Threshold Cryptosystems", 2020 IEEE Symposium on Security and Privacy, pp. 877-893.
G. Tillem et al., "Threshold Signatures using Secure Multiparty Computation", Dec. 11, 2020, pp. 1-10.
Guy Golan Gueta et al., "SBFT: a Scalable Decentralized Trust Infrastructure for Blockchains", Apr. 5, 2018, 23 pages.
International Preliminary Report on Patentability for Application No. PCT/EP2021/056003, completed date Jun. 21, 2023, 67 pages.
Jean-Philippe Aumasson et al., A Survey of ECDSA Threshold Signing. IACR Cryptol. ePrint Arch. 2020: 1390 (2020), 14 pages.
Kobi Gurkan et al., "Aggregatable Distributed Key Generation", Jan. 1, 2021, 52 pages.
Paul Feldman, A practical scheme for non-interactive verifiable secret sharing. In 28th Annual Symposium on Foundations of Computer Science, pp. 427-437, Los Angeles, California, Oct. 12-14, 1987. IEEE Computer Society Press.

(Continued)

*Primary Examiner* — Ellen Tran
(74) *Attorney, Agent, or Firm* — Mannava & Kang, P.C.

(57) ABSTRACT

Embodiments of the invention relate to a distributed network. The distributed network comprises a replicated system computing cluster comprising system computational units. The system computational units comprise deterministic subunits configured to perform a deterministic and replicated computation across the replicated system computing cluster and non-deterministic subunits for performing non-deterministic computations. The replicated system computing cluster is configured to perform a secure multi-party computation, in particular a computation of a threshold-signature.

17 Claims, 9 Drawing Sheets

(56) References Cited

PUBLICATIONS

Rosario Gennaro et al., "Secure distributed key generation for discrete-log based cryptosystems". In Jacques Stern, editor, Advances in Cryptology—EUROCRYPT'99, vol. 1592 of Lecture Notes in Computer Science, pp. 295-310, Prague, Czech Republic, May 2-6, 1999. Springer, Heidelberg, Germany.
Timo Hanke et al., "DFINITY Technology Overview Series Consensus System", May 11, 2018, 16 pages.
Torben P. Pedersen. A threshold cryptosystem without a trusted party (extended abstract) (rump session). In Donald W. Davies, editor, Advances in Cryptology—EUROCRYPT'91, vol. 547 of Lecture Notes in Computer Science, pp. 522-526, Brighton, UK, Apr. 8-11, 1991. Springer, Heidelberg, Germany.
William D., "SED 988", Jan. 21, 2020, pp. 1-30.

MULTI-PARTY COMPUTATIONS IN A DISTRIBUTED NETWORK

CLAIM FOR PRIORITY

The present application is a national stage filing under 35 U.S.C 371 of PCT application number PCT/EP2021/056003, having an international filing date of Mar. 10, 2021, the disclosure of which is hereby incorporated by reference in its entirety.

TECHNICAL FIELD

The present invention pertains to a distributed network comprising one or more replicated computing clusters. The one or more replicated computing clusters each comprises a plurality of nodes. Each of the plurality of nodes of the replicated computing cluster is configured to run a replica.

Further aspects relate to a computer-implemented method, a node of a distributed network and a corresponding computer program product.

BACKGROUND ART

In distributed networks a plurality of nodes are arranged in a distributed fashion. In distributed networks computing, software and data are spread out across the plurality of nodes. The nodes establish computing resources and the distributed networks may use distributed computing techniques.

An example of distributed networks are blockchain networks. Blockchain networks are consensus-based, electronic ledgers based on blocks. Each block comprises transactions and other information. Furthermore, each block contains a hash of the previous block so that blocks become chained together to create a permanent, unalterable record of all transactions which have been written to the blockchain. Transactions may call small programs known e.g. as smart contracts.

In order for a transaction to be written to the blockchain, it must be "validated" and agreed upon by the network. In other words, the network nodes have to reach consensus on blocks to be written to the blockchain. Such a consensus may be achieved by various consensus protocols.

In one type of blockchain networks, consensus is achieved by using a proof-of-work algorithm. A proof-of-work consensus protocol generally requires some work from the parties that participate in the consensus protocol, usually corresponding to processing time by a computer. Proof-of-work-based cryptocurrency systems such as Bitcoin involve the solving of computationally intensive puzzles to validate transactions and to create new blocks.

Another type of consensus protocols is based on a proof-of-stake algorithm. Such proof-of-stake protocols have the advantage that they do not require time-consuming and energy-intensive computing. In proof-of-stake based blockchain networks e.g. the creator of the next block is chosen via combinations of random selection as well as the stake of the respective node in the network.

Consensus protocols used in blockchain networks can be designed to reach fast finality on transactions contained in blocks by applying a "Byzantine fault tolerant" (BFT) agreement protocol. "Synchronous" BFT protocols rely on network synchrony assumptions for safety, while "asynchronous" BFT protocols do not. Asynchronous BFT protocols can typically tolerate less than ⅓ (one third) corrupt participating nodes.

Apart from cryptocurrencies, distributed networks may be used for various other applications.

In particular, they may be used for providing decentralized and distributed computing capabilities and services.

One challenge of such distributed networks which provide distributed computing services is to provide enhanced network and/or service functionalities.

DISCLOSURE OF THE INVENTION

Accordingly, one object of an aspect of the invention is to provide a distributed network comprising one or more replicated computing clusters which provides enhanced functionalities, in particular a functionality for performing secure multi-party computations.

According to an embodiment of a first aspect of the invention there is provided a distributed network. The distributed network comprises one or more replicated computing clusters. Each of the one or more replicated computing clusters comprises a plurality of nodes. The one or more replicated computing clusters comprise a replicated system computing cluster and each of the plurality of nodes of the replicated system computing cluster is configured to run a system computational unit. The system computational units of the replicated system computing cluster comprise deterministic subunits which are configured to perform a deterministic and replicated computation across the replicated system computing cluster and non-deterministic subunits for performing non-deterministic computations. The replicated system computing cluster is configured to perform a secure multi-party computation by invoking, by a system call, the system computational units for performing the multi-party computation and by performing, by the system computational units, the multi-party computations. The replicated system computing cluster is further configured to perform the secure multi-party computation by providing, by the deterministic subunits of the system computational units, a deterministic and replicated control functionality for the multi-party computation, by providing, by the non-deterministic subunits of the system computational units, non-deterministic data for the multi-party computation and by providing, by the system computational units, a response to the system call comprising a result of the multi-party computation.

Such a distributed network provides as an enhanced functionality the possibility to invoke system calls for performing a secure multi-party computation. Such system calls may be invoked according to embodiments to system computational units of a replicated system computing cluster, e.g. by issuing the system call to a respective system call address of the distributed network. The system computational units establish the multiple parties of the secure multi-party computation and perform the multi-party computation. Such a secure multi-party computation may involve the computation of a function over input data provided by the multiple parties, wherein the multiple parties keep their respective input data secret/private.

The system computational units comprise deterministic subunits and non-deterministic subunits. The deterministic subunits provide a deterministic and replicated control functionality for the multi-party computation. Such a deterministic and replicated control functionality may be defined as a functionality which controls the performance and execution of the multi-party computation in a deterministic and replicated manner across the replicated system computing cluster. The control functionality may encompass in particular control parameters and/or control states which are replicated across the system computational units of the replicated system computing cluster. As an example, it may provide checkpoints or intermediate results during the multi-party computation on which the system computational units of all nodes have to reach consensus on. This allows an enhanced control of the multi-party computation.

The non-deterministic subunits of the respective system computational units may on the other hand generate or use non-deterministic data, i.e. in particular data that is not replicated across the replicated system computing cluster. This data may be in particular data which is individual, private, confidential and/or secret to the respective individual system computational units of a node and shall hence not be shared with the other system computational units of the replicated system computing cluster. In particular, the non-deterministic subunits may store secret/private input data of the parties/system computational units to be used for the secure multi-party computation.

According to embodiments, both the deterministic and the non-deterministic subunits are involved in the multi-party computation during the multi-party computation.

According to embodiments, the deterministic subunits of the system computational units are configured to receive the system call, to trigger or in other words initiate the multi-party computation and to provide the response of the system call. Hence according to such embodiments the deterministic sub-units establish the entry/input point as well as the exit/output point for the multi-party computation. Accordingly, the associated input values/input parameters as well as the associated output values/output parameters are replicated across all the system computational units of the replicated system computing cluster.

A computational unit may be defined as a piece of software that is running on the network and which comprises a deterministic subunit which has its own unit state. According to embodiments, a deterministic subunit of a computational unit may be defined as a deterministic program and a non-deterministic subunit of a computational unit may be defined as a non-deterministic program.

According to embodiments, the multi-party computation may be a threshold signature computation. Such a threshold signature may be performed with a predefined minimum number of secret key shares corresponding to a verification key of the replicated system computing cluster.

According to embodiments, the threshold signature computation is a computation by means of a threshold Elliptic Curve Digital Signature Algorithm (ECDSA). The ECDSA is a variant of the Digital Signature Algorithm (DSA) and uses elliptic curve cryptography. Such ECDSA-signatures provide the advantage of smaller public key sizes for the same security level as compared with DSA-signatures.

According to embodiments, the non-deterministic data comprises key-shares of a threshold-signature scheme. According to such an embodiment each of the non-deterministic subunits of the system computational units may store its own individual secret key-share of the threshold signature scheme and use this for the joint execution of threshold signature together with the other system computational units of the replicated system computing cluster.

According to embodiments, the control functionality comprises controlling a message flow of the multi-party computation. Such an embodiment may ensure that a predefined set of messages of the multi-party computation is replicated across the replicated system computing cluster and hence is received by a sufficient number of the system computational units of the replicated system computing cluster.

According to embodiments, the control functionality comprises controlling a charging for the multi-party computation. Such a charging or in other words such a payment may be imposed for the use of resources of the distributed network which are needed for the performance of the multi-party computation. In this respect a resource may generally be any physical or virtual resource of the distributed network and may also be denoted as network resource. These resources may include computational resources such as the processing power of processors of the distributed network, memory and storage resources as well as network connections and their associated bandwidth. The charges or in other words the payments for the use of the resources may be in particular processed in complementary accounting units that are used by the distributed network to charge for the use of its resources. Such a complementary accounting unit may be separate from the native currency of the network. According to embodiments, such a complementary accounting unit may be denoted as gas or fuel. As an analogy to a car, like fuel or gas is needed to run a car, the gas according to embodiments of the invention is needed to run the resources of the distributed network. The terms "charges" and "payments" shall be understood in a broad sense and may be used in an interchangeable way.

According to embodiments, the control functionality comprises controlling a response guarantee for the system call. Such a response guarantee may ensure that each system call gets a response.

According to embodiments, the distributed network is further configured to provide a unidirectional communication mechanism from the deterministic subunits to the non-deterministic subunits. Such a communication mechanism may provide a direct access of the non-deterministic subunits on replicated unit states of the deterministic sub-units. This enhances the efficiency of the non-deterministic subunits.

According to embodiments, the unidirectional communication mechanism is a push-mechanism. Such a mechanism may allow the deterministic subunits to write or transfer some deterministic state to the non-deterministic subunits for further processing, in particular to some dedicated storage of the non-deterministic subunits.

According to embodiments, the unidirectional communication mechanism is a pull-mechanism. This allows the non-deterministic subunits to pull or in other words fetch some deterministic state from the deterministic subunits.

According to embodiments, the distributed network is further configured to provide a unidirectional communication mechanism from the non-deterministic subunits to the deterministic subunits via a consensus mechanism. The consensus mechanism may involve the execution of a consensus protocol, e.g. a proof-of-stake consensus protocol.

This allows the non-deterministic subunits to commonly agree on some computational results, e.g. a joint signature, and to feed this back as deterministic state to the deterministic subunits.

According to embodiments, the system computational units may be configured to provide as functionality a performing of a distributed public key generation algorithm for generating a public verification key and a set of secret key shares corresponding to the public verification key.

According to such an embodiment the replicated system computing cluster may generate a public verification key as a service, e.g. for users of the distributed network or for other computational units running on the network. The corresponding secret key shares may then be stored as a service by the non-deterministic subunits of the replicated system computing cluster and can be subsequently used for performing signature services.

According to embodiments, the system computational units may be configured to provide as functionality a performing of a threshold signature algorithm with respect to a public verification key.

According to such an embodiment the replicated system computing cluster may execute threshold signatures as a service, e.g. for users of the distributed network or for other computational units running on the network. More particularly, the replicated system computing cluster may receive a signature request for performing a threshold signature comprising a public verification key and a message. The replicated system computing cluster may then use secret key shares corresponding to the received public verification key (which have been generated and stored previously) for executing the requested threshold signature. Furthermore, it may return a message with the executed threshold signature.

According to embodiments, the system computational units may be configured to provide as functionality a performing of a deletion of a set of stored secret key shares corresponding to a public verification key. According to such an embodiment the replicated system computing cluster may receive a deletion request to perform a deletion of a set of secret key shares. The deletion request includes a public verification key corresponding to the secret key shares that shall be deleted. The replicated system computing cluster, more particularly the non-deterministic subunits may then delete the stored set of secret key shares corresponding to the received public verification key. Such a functionality may be used by the respective requestor if the public verification is not needed anymore. This may then avoid a further payment/charging for the storage of the secret key shares.

According to embodiments, the one or more replicated computing clusters comprise one or more replicated application computing clusters. Each of the plurality of nodes of the replicated application computing clusters is configured to run one or more application computational units for providing application services to users of the distributed network. The one or more application computational units are configured to perform a deterministic and replicated computation across the respective replicated application computing cluster.

The application computational units are computational units which are configured to provide application services to users of the network. Such application services may encompass e.g. the hosting of a website, the offering of travel services such as the booking of a trip, the provision of a messaging service etc.

According to embodiments, the system call may be invoked by one or more application computational units. Such a distributed network offers enhanced functionalities for the application computational units. More particularly, the application computational units may use the replicated system computing cluster to perform secure multi-party computations on their request. As an example, if the application service is embodied as a travel service, the corresponding application computational unit may ask a system computational unit to execute a threshold signature on a travel contract.

According to other embodiments, the system call may be invoked by a user of the distributed network or by another system computational unit. In the above example, a user that has received a travel contract from an application computational unit may ask a system computational unit to execute a threshold signature on the travel contract.

According to embodiments, the replicated system computing cluster may be embodied as a dedicated computing cluster for performing the multi-party computation. The dedicated computing cluster may comprise only system computational units.

According to embodiments, the replicated system computing cluster may be embodied as a mixed computing cluster for performing the multi-party computation and for providing application services. Each of the plurality of nodes of the mixed computing cluster may be configured to run the system computational unit and one or more application computational units.

According to an embodiment of another aspect a computer-implemented method for operating a distributed network according to the first aspect is provided. The method comprises performing, by the replicated system computing cluster a secure multi-party computation by invoking, by a system call, the system computational units for performing the multi-party computation;

performing, by the system computational units, the multi-party computations;

providing, by the deterministic subunits of the system computational units, a deterministic and replicated control functionality for the multi-party computation;

providing, by the non-deterministic subunits of the system computational units, non-deterministic data for the multi-party computation; and providing, by the system computational units, a response to the system call comprising a result of the multi-party computation.

According to an embodiment of another aspect of the invention, a node of a distributed network is provided.

According to an embodiment of another aspect of the invention, a computer program product for operating a distributed network is provided. The computer program product comprises a computer readable storage medium having program instructions embodied therewith, the program instructions executable by one or more of system computational units to cause the one or more of the system computational units to perform steps of the method aspect of the invention.

Features and advantages of one aspect of the invention may be applied to the other aspects of the invention as appropriate.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein.

MODES FOR CARRYING OUT THE INVENTION

Figure 1:
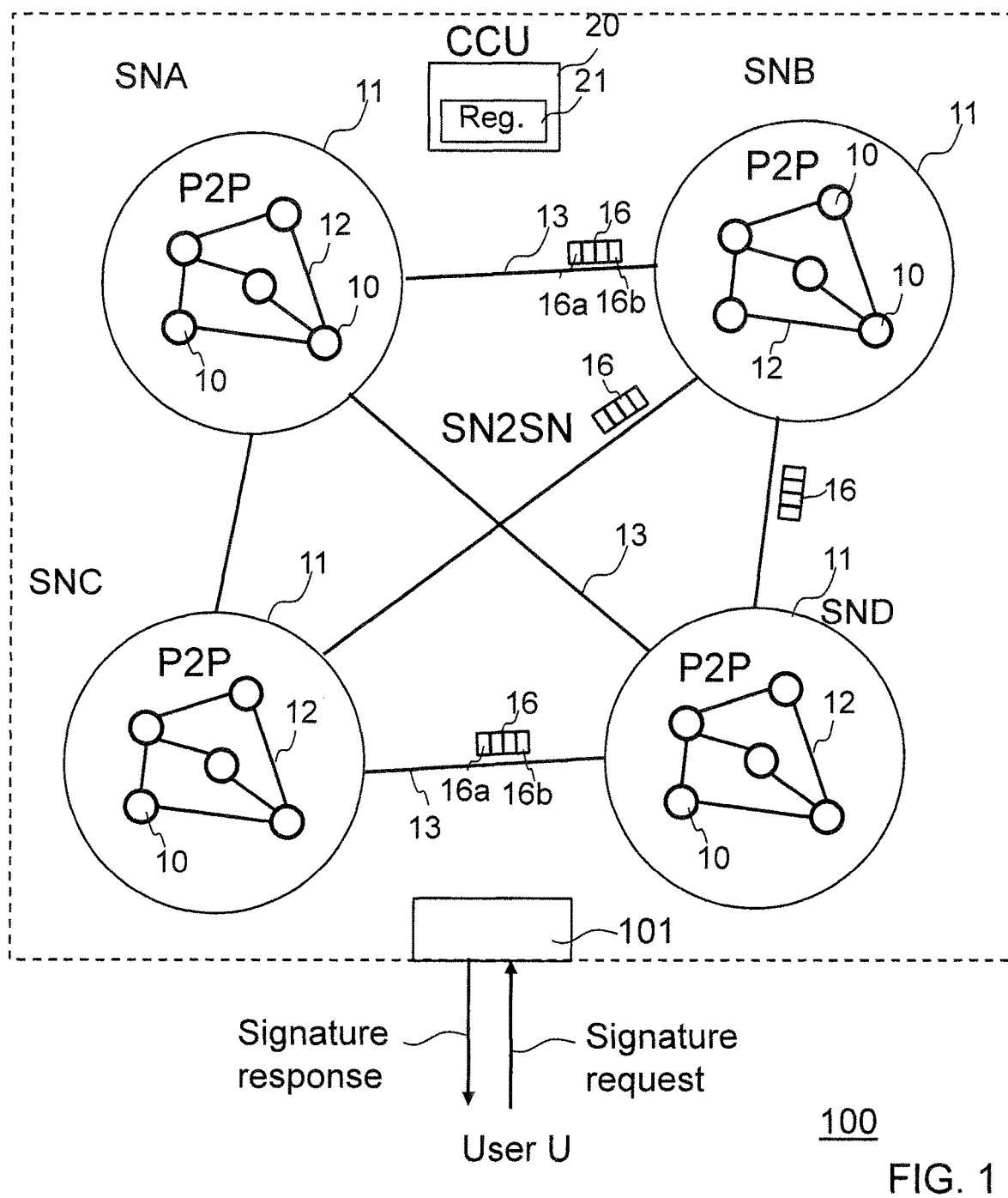
FIG. 1 shows an exemplary diagram of a distributed network according to an embodiment of the invention.

At first, some general aspects and terms of embodiments of the invention will be introduced.

According to embodiments, a distributed network comprises a plurality of nodes that are arranged in a distributed fashion. In such a distributed network computing, software and data is distributed across the plurality of nodes. The nodes establish computing resources and the distributed network may use in particular distributed computing techniques.

According to embodiments, distributed networks may be embodied as blockchain networks. The term "blockchain" shall include all forms of electronic, computer-based, distributed ledgers. According to some embodiments, the blockchain network may be embodied as proof-of-work blockchain network. According to other embodiments, the blockchain network may be embodied as proof-of-stake blockchain network.

A verification key: a bit-string of a public key signature scheme intended to be widely publicized. A verification key may also be denoted as public key and may be used e.g. for the verification of digital signatures of the public key signature scheme.

A public-key signature scheme according to embodiments of the invention may comprise e.g. keys of a public-key signature and encryption scheme such as RSA or keys of a public-key signature scheme such as Schnorr or DSA.

Secret key (sk): a bit-string related to a public key, in particular a verification key, enabling some cryptographic operation, in particular digitally signing a message.

Distributed key generation (DKG): a protocol enabling a set of dealers to create a public key, in particular a verification key, and provide a set of receivers with a secret key share of the corresponding secret key.

(n,t)-threshold key/threshold secret key: Such a threshold key has a threshold t and a number of secret key shares $s_1, \ldots, s_n$ such that any t secret key shares enable reconstruction of the secret key, while t−1 shares do not suffice to determine the secret key. In case of a threshold public key signature scheme, any t secret key shares enable the execution of a valid signature under the threshold public key/verification key, while t−1 shares do not suffice to execute a valid signature.

According to embodiments, the Feldman protocol [Fel87], joint Feldman protocol [Ped91] and the GJKR protocol [GJKR99] may be used as distributed key generation protocols. These protocols are e.g. published as follows and their corresponding disclosure is herewith incorporated by reference:

[Fel87] Paul Feldman. A practical scheme for non-interactive verifiable secret sharing.

In 28th Annual Symposium on Foundations of Computer Science, pages 427-437, Los Angeles, California, Oct. 12-14, 1987. IEEE Computer Society Press.

[Ped91] Torben P. Pedersen. A threshold cryptosystem without a trusted party (extended abstract) (rump session). In Donald W. Davies, editor, Advances in Cryptology—EUROCRYPT'91, volume 547 of Lecture Notes in Computer Science, pages 522-526, Brighton, UK, Apr. 8-11, 1991. Springer, Heidelberg, Germany.

[GJKR99] Rosario Gennaro, Stanislaw Jarecki, Hugo Krawczyk, and Tal Rabin. Secure distributed key generation for discrete-log based cryptosystems. In Jacques Stern, editor, Advances in Cryptology—EUROCRYPT'99, volume 1592 of Lecture Notes in Computer Science, pages 295-310, Prague, Czech Republic, May 2-6, 1999. Springer, Heidelberg, Germany.

Elliptic Curve Digital Signature Algorithm (ECDSA):

The ECDSA is a variant of the Digital Signature Algorithm (DSA) and uses elliptic curve cryptography. More particularly, ECDSA signatures operate over an elliptic curve or a subgroup of an elliptic curve.

Threshold Elliptic Curve Digital Signature Algorithm:

A threshold signature algorithm based on elliptic curve cryptography, wherein any t secret key shares enable the execution of a valid ECDSA signature under the threshold ECDSA-public key/verification key, while t−1 shares do not suffice to execute a valid ECDSA-signature.

Such a threshold Elliptic Curve Digital Signature Algorithm (ECDSA) is e.g. described in the document by Jean-Philippe Aumasson, Adrian Hamelink, Omer Shlomovits: A Survey of ECDSA Threshold Signing. IACR Cryptol. ePrint Arch. 2020: 1390 (2020).

Secure multi-party computation: Secure multi-party computation refers generally to methods according to which multiple parties jointly compute a function over input data provided by the multiple parties, wherein the multiple parties keep their respective input data secret/private. Secure multi-party computation may also be denoted just as multi-party computation (MPC) or privacy-preserving computation.

According to embodiments, the term multi-party computation may refer in particular to methods according to which multiple parties, e.g. n parties $p_1, p_2, \ldots, p_N$, each have private/secret data, e.g. $s_1, s_2, \ldots, s_N$ respectively. Furthermore, the multiple parties want to compute the value of a public function F on that private/secret data: $F(s_1, s_2, \ldots, s_N)$ while keeping their own input data private/secret, i.e., do secure function evaluation.

According to embodiments, multi-party computation may make use in particular of (n,t)-threshold keys/threshold secret keys as private/secret data.

According to embodiments, multi-party computation may comprise in particular the computation of threshold signatures.

FIG. 1 shows an exemplary block diagram of a distributed network 100 according to an embodiment of the invention.

The distributed network 100 comprises a plurality of nodes 10, which may also be denoted as network nodes 10. The plurality of nodes 10 are assigned to a plurality of replicated computing clusters 11. The replicated computing clusters 11 establish and may be in the following denoted as subnetworks 11. In the example of FIG. 1, four subnetworks 11 denoted with SNA, SNB, SNC and SND are provided.

Each of the plurality of subnetworks 11 is configured to run a set of computational units on each node of the respective subnetwork 11. According to embodiments, a computational unit shall be understood as a piece of software, in particular as a piece of software that comprises or has its own unit state or in other words execution state.

According to embodiments, a unit state shall be understood as all the deterministic data or information that is used by the deterministic subunits of the computational units, in particular the data that the computational units store in variables, but also data the computational units get from remote calls. The unit state may represent in particular storage locations in the respective memory locations of the respective node. The contents of these memory locations, at any given point in the execution of the computational units, is called the unit state according to embodiments. The computational units may be in particular embodied as stateful computational units, i.e. the computational units are designed according to embodiments to remember preceding events or user interactions.

The network 100 comprises communication links 12 for intra-subnetwork communication within the respective subnetwork 11, in particular for intra-subnetwork unit-to-unit messages to be exchanged between computational units assigned to the same subnetwork.

Furthermore, the network 100 comprises communication links 13 for inter-subnetwork communication between different ones of the subnetworks 11, in particular for inter-subnetwork unit-to-unit messages to be exchanged between computational units assigned to different subnetworks.

Accordingly, the communication links 12 may also be denoted as intra-subnetwork or Peer-to-Peer (P2P) communication links and the communication links 13 may also be denoted as inter-subnetwork or Subnetwork-to-Subnetwork (SN2SN) communications links.

According to embodiments of the invention the subnetworks 11 are configured to replicate the set of computational units across the respective subnetwork 11. More particularly, the subnetworks 11 are configured to replicate the unit state of the computational units across the respective subnetwork 11.

The network 100 may in particular be a proof-of-stake blockchain network.

The network 100 is configured to exchange inter-subnetwork messages 16 between the subnetworks SNA, SNB, SNC and SND via a messaging protocol and a consensus protocol. The consensus protocol is configured to reach a consensus on the processing order of the inter-subnetwork messages 16 at the respective receiving subnetwork.

According to embodiments, the network 100 may be configured to run the consensus protocol separately on each subnetwork. In other words, each of the subnetworks SNA, SNB, SNC and SND runs its own consensus protocol separately and independently from the other subnetworks.

The distributed network 100 may comprise a central control unit CCU, 20. The central control unit 20 may comprise a central registry 21 to provide network control information to the nodes of the network.

According to embodiments, at least one of the subnetworks SNA, SNB, SNC or SND is embodied as a replicated system computing cluster. Each of the nodes of such a replicated system computing cluster comprises a system computational unit. Such a system computing cluster may perform multi-party computations such as threshold signatures.

The distributed network 100 may provide a user interface 101 to users of the distributed network 100.

The user may send a signature request for signing e.g. a message M by means of a threshold signature, e.g. a threshold ECDSA-signature. The signature request may be performed by means of a system call. The distributed network 100 may execute the requested signature by the system computational units of the replicated system computing cluster and may provide a signature response comprising the message M with the executed signature via the user interface 101.

Figure 2:
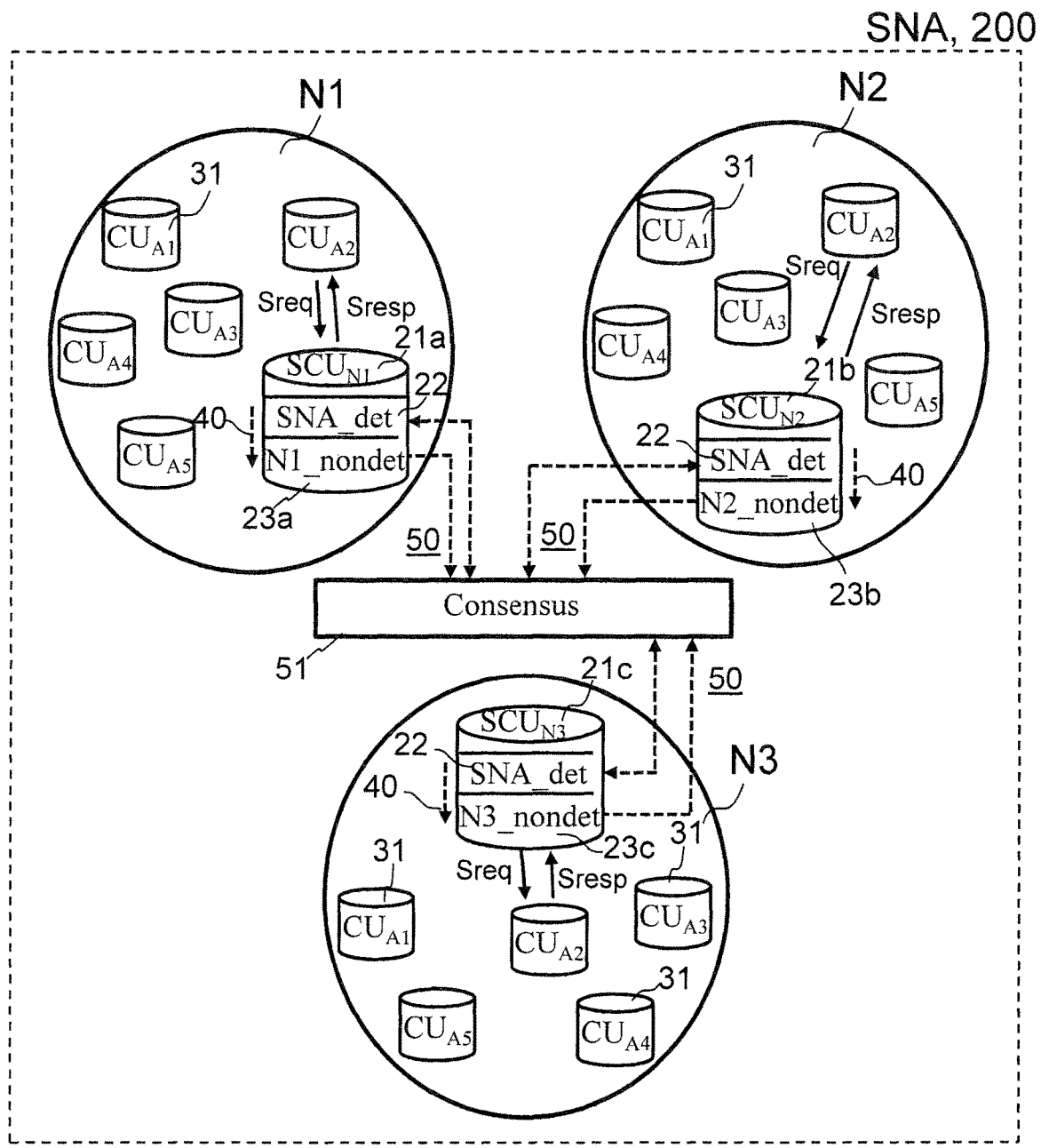
FIG. 2 illustrates an exemplary replicated system computing cluster.

FIG. 2 illustrates in a more detailed way an exemplary replicated computing cluster/subnetwork SNA, 200 comprising a plurality of nodes N1, N2 and N3. The replicated computing cluster 200 is embodied as a system computing cluster. Each of the plurality of nodes N1, N2 and N3 of the replicated system computing cluster 200 is configured to run a system computational unit. More particularly, the system computational units encompass a system computational unit 21a, $SCU_{N1}$ running on the node N1, a system computational unit 21b, $SCU_{N2}$ running on the node N2 and a system computational unit 21c, $SCU_{N3}$ running on the node N3. The system computational units 21a, 21b and 21c may be commonly referred to as system computational units 21. The system computational units 21a, 21b and 21c of the replicated system computing cluster 200 comprise deterministic subunits 22, SNA_det configured to perform a deterministic and replicated computation across the replicated system computing cluster 200, SNA and traverse thereby the same chain of unit states. The system computational units 21a, 21b and 21c of the replicated system computing cluster 200 comprise furthermore non-deterministic subunits for performing non-deterministic computations. More particularly, the system computational unit 21a, $SCU_{N1}$ comprises a non-deterministic subunit 23a, N1_nondet. The non-deterministic subunit 23a may store and compute non-deterministic data which is specific/individual to the node N1. Likewise, the system computational unit 21b, $SCU_{N2}$ comprises a non-deterministic subunit 23b, N2_nondet which may store and compute non-deterministic data which is specific/individual to the node N2. And the system computational unit 21a, $SCU_{N3}$ comprises a non-deterministic subunit 23c, N3_nondet which may store and compute non-deterministic data which is specific/individual to the node N3. In addition, each of the nodes N1, N2 and N3 is configured to run one or more application computational units for providing application services to users of the distributed network. More particularly, each of the nodes N1, N2 and N3 is configured to run a set of five application computational units 31, more particularly the application computational units $CU_{A1}$, $CU_{A2}$, $CU_{A3}$, $CU_{A4}$ and $CU_{A5}$. These application computational units $CU_{A1}$, $CU_{A2}$, $CU_{A3}$, $CU_{A4}$ and $CU_{A5}$ are also configured to perform a deterministic and replicated computation across the system computing cluster 200. As the system computing cluster 200 comprises both application computational units and system computational units, it may be denoted as a mixed computing cluster.

Each of the system computational units 21a, 21b and 21c has a unidirectional communication mechanism 40 from the deterministic subunits 22 to the respective non-deterministic subunits 23a, 23b and 23c.

In addition, each of the system computational units 21a, 21b and 21c may establish a unidirectional communication mechanism 50 from the non-deterministic subunits 23a, 23b and 23c to the deterministic subunits 22. The communication mechanism 50 comprises a consensus mechanism 51.

The consensus mechanism 51 may be used to reach a consensus on the messages provided to each of the deterministic subunits 22 such that the deterministic subunits 22 all have the same view/state of the non-deterministic data provided by one of the respective non-deterministic subunits 23a, 23b or 23c.

According to embodiments each of the application computational units $CU_{A1}$, $CU_{A2}$, $CU_{A3}$, $CU_{A4}$ or $CU_{A5}$ may invoke a system call to the system computational units 21a, 21b and 21c for performing a multi-party computation. The system call may be in particular a signature request for performing a signature on e.g. a message M provided by the respective application computational unit. In FIG. 2 there is illustrated a signature request Sreq which is issued by the application computational unit $CU_{A2}$. As a result of the multi-party computation performed by the system computational units 21a, 21b and 21c, the application computational unit $CU_{A2}$ receives a signature response Sresp.

Figure 3:
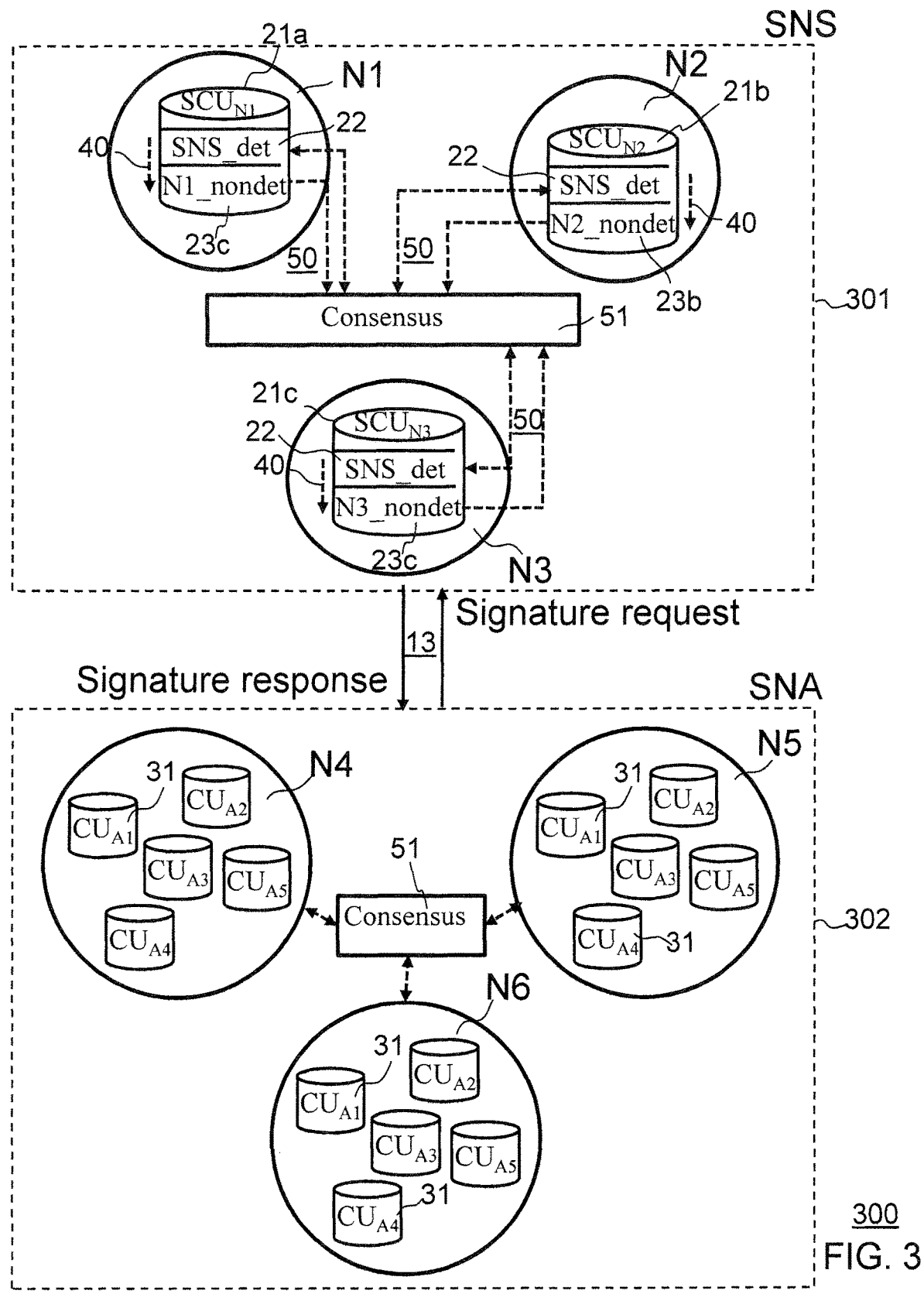
FIG. 3 shows a distributed network comprising a replicated system computing cluster and a replicated application computing cluster.

FIG. 3 shows a distributed network 300 which comprises two replicated computing clusters/subnetworks, more particularly a replicated system computing cluster 301, SNS and a replicated application computing cluster 302, SNA. The replicated system computing cluster 301 is embodied as a dedicated computing cluster for performing the multi-party computation and comprises only system computational units, but no application computational units. It may hence be denoted as a dedicated system computing cluster. More particularly, the replicated system computing cluster 301 comprises a plurality of nodes N1, N2 and N3. Each of the plurality of nodes N1, N2 and N3 of the replicated system computing cluster 301 is configured to run a system computational unit. More particularly, the system computational units encompass a system computational unit 21a, $SCU_{N1}$, running on the node N1, a system computational unit 21b, $SCU_{N2}$ running on the node N2 and a system computational unit 21c, $SCU_{N3}$ running on the node N3. The system computational units 21a, 21b and 21c of the replicated system computing cluster 301 may be embodied in the same manner as described with reference to FIG. 2 and may hence comprise deterministic subunits 22, SNS_det configured to perform a deterministic and replicated computation across the replicated system computing cluster 301, SNS and non-deterministic subunits 23a/N1_nondet, 23b/N2_nondet and 23c/N3_nondet.

The replicated application computing cluster 302, SNA comprises nodes N4, N5 and N6 which are configured to run a set of five application computational units 31, more particularly the application computational units $CU_{A1}$, $CU_{A2}$, $CU_{A3}$, $CU_{A4}$ and $CU_{A5}$. These application computational units $CU_{A1}$, $CU_{A2}$, $CU_{A3}$, $CU_{A4}$ and $CU_{A5}$ are configured to perform a deterministic and replicated computation across the replicated application computing cluster 302. As the replicated application computing cluster does not comprise any system computational units, it may also be considered a dedicated application computing cluster.

The replicated system computing cluster 301 comprises a communication mechanism 50 comprising a consensus mechanism 51 which may be used to establish a unidirectional communication from the non-deterministic subunits 23a, 23b and 23c to the deterministic subunits 22. In addition, the consensus mechanism 51 may also be used for a communication of messages between the deterministic subunits 22 of the system computational units 21.

The replicated application computing cluster 302 comprises also a communication mechanism 50 comprising a consensus mechanism 51 which may be used for a communication of messages between the application computational units 31.

Between the replicated system computing cluster 301 and the replicated application computing cluster 302 there is provided an inter-subnetwork communication mechanism 13 which may be used to exchange messages between the application computational units 31 of the replicated application computing cluster 302 and the system computational units 21 of the replicated system computing cluster 301.

According to embodiments each of the application computational units 31 may invoke a system call to the system computational units 21a, 21b and 21c for performing a multi-party computation via the inter-subnetwork communication mechanism 13. The system call may be in particular a signature request for performing a signature on e.g. a message M provided by the respective application computational unit. As a result of the multi-party computation, performed by the system computational units 21a, 21b and 21c, the respective application computational 31 may receive a corresponding signature response via the inter-subnetwork communication mechanism 13.

Figure 4:
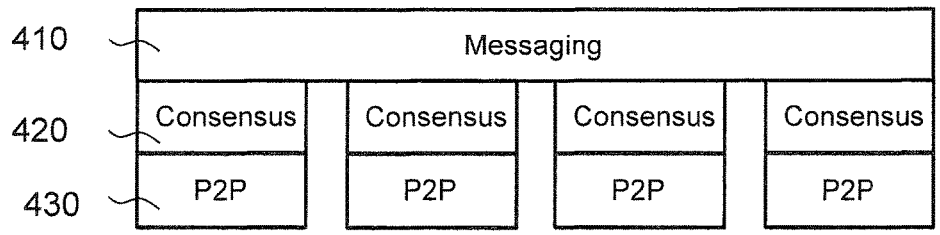
FIG. 4 shows a layer model illustrating main layers of a communication scheme of a distributed network.

FIG. 4 shows a more detailed layer model 400 400 illustrating main layers of a communication scheme of a distributed network according to an embodiment of the invention. The layer model 400 facilitates in particular the communication between computational units of the distributed network including the exchange of inter-subnetwork and intra-subnetwork messages as well as from user messages from users of the network. The user messages may also be denoted as ingress messages.

The layer model 400 comprises a messaging layer 410 which is configured to serve as an upper layer for the communication and perform the routing of messages within the distributed network.

The layer model 400 further comprises a plurality of consensus layers 420. According to embodiments each replicated computing cluster/subnetwork may run its own consensus layer 420. The consensus layers 420 may be configured to receive messages from computational units of its own subnetwork/replicated computing cluster, messages from other subnetworks/replicated computing clusters as well as user messages/ingress messages. The consensus layers 420 may be further configured to reach a consensus on the messages to be processed and to organize them, in particular by agreeing on a processing order, in a sequence of input blocks which are then further processed by the respective replicated computing cluster/subnetwork. In addition, the layer model 400 comprises a peer-to-peer (P2P) layer that is configured to organize and drive communication between the nodes of a single replicated computing cluster/subnetwork.

According to embodiments, the network may comprise a plurality of further layers, in particular an execution layer which may be configured to execute execution messages on the computational units of the network.

The layer model 400 may be used to implement the communication scheme 50 between the non-deterministic subunits 23a, 23b and 23c and the deterministic subunits 22 as shown in FIGS. 2 and 3. The consensus layer 420 may be used to implement the consensus mechanism 51 illustrated in FIGS. 2 and 3.

Figure 5:
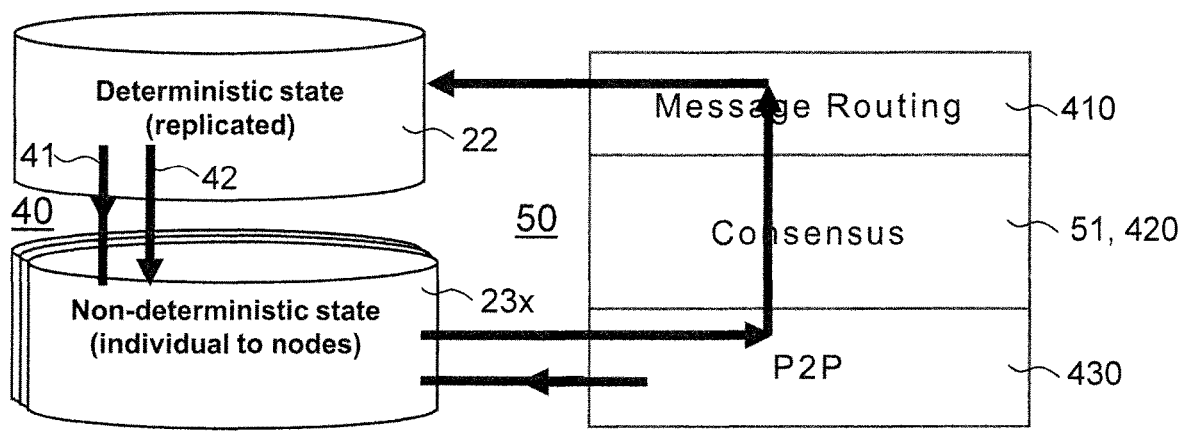
FIG. 5 shows a more detailed illustration of a system computational unit according to an embodiment of the invention.

FIG. 5 shows a more detailed illustration of a system computational unit 521 according to an embodiment of the invention.

The system computational unit 521 comprises a deterministic subunit 22 and a non-deterministic subunit 23x of a node Nx. The deterministic subunit 22 comprises a deterministic state which is replicated across the nodes, while the non-deterministic subunit 23x comprises a non-deterministic state which may be individual to the corresponding node Nx.

The deterministic subunit 22 may communicate with the non-deterministic subunit 23x via a unidirectional communication mechanism 40 from the deterministic subunit 22 to the non-deterministic subunit 23x. The unidirectional communication mechanism 40 may encompass a push-mechanism 41 and a pull-mechanism 42.

Furthermore, there is a unidirectional communication mechanism 50 from the non-deterministic subunit 23x to the deterministic subunit 22 via a consensus mechanism 51. More particularly, the non-deterministic subunit 23x may communicate with its corresponding deterministic subunit 22 via the communication mechanism 50. As described with reference to FIG. 4, the communication mechanism 50 may encompass/use the P2P layer 430, the consensus layer 420 and the messaging layer 410 of the layer model 400. The corresponding message has to go through the consensus mechanism 51 encompassing/using the consensus layer 420 and hence has to be agreed upon by the nodes of the respective subnetwork/replicated computing cluster. This means that the deterministic subunits 22 of all the corresponding system computational units which run on the nodes of the replicated system computing cluster receive and process the same message.

Figure 6:
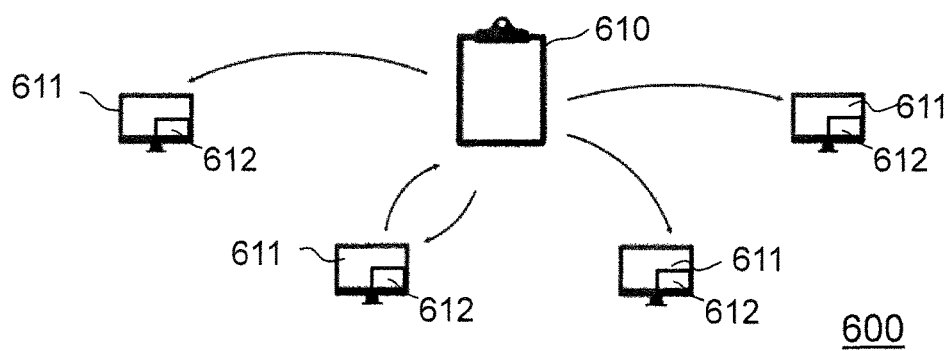
FIG. 6 illustrates a distributed network comprising a bulletin board.

FIG. 6 shows a distributed network comprising a replicated system computing cluster 600 according to an embodiment of the invention. The replicated system computing cluster 600 is configured to perform threshold signatures, in particular ECDSA-signatures. The replicated system computing cluster 600 comprises 4 nodes 611. The distributed network further comprises a bulletin board 610. Each of the nodes 611 runs a system computational unit 612 as ECDSA signer-component for performing ECDSA-signatures. The bulletin board 610 keeps the deterministic state for each of the ECDSA signer-components which run on the nodes 611.

More particularly, the bulletin board 610 provides a consistent view on the messages received in the signature protocol to all parties. The bulletin board may be implemented by the consensus protocol that provides a ledger of agreed messages, where the messages pertaining to ECDSA form the state of the bulletin board. This ensures that all parties always run the steps in the protocol from a consistent state. The non-deterministic subunits of the system computational units 612 store and use cryptographic keys on the respective node.

For key generation, the nodes 611 run an interactive protocol to generate an ECDSA public key y=g^x and a matching threshold secret sharing of the secret key x.

For signing a message, the system computational units 612 look up the secret shares that match the specified public key. If none exists, the system computational units 612 may prepare a rejection response. Then the system computational units 612 hash the input messages and run an interactive signing protocol, which provides a signature (r,s).

For key deletion/erasure, the system computational units 612 look up the secret share that matches the specified public key. The system computational units 612 delete/erase then the matching threshold secret share on the respective node, and jointly with the other nodes prepare a confirmation response.

When a protocol response is ready, the ECDSA signer component passes it through the consensus mechanism back to the deterministic part of the system computational unit 612. The deterministic part may now wrap up a payment/charging and respond to the system call. Optionally, it may return a default rejection if e.g. the ECDSA operation times out.

It should be noted that there are other ways than a bulletin board (ledger) that may be used to manage the multi-party computation between the nodes. According to one embodiment, nodes use the P2P (gossip part) to broadcast messages to each other and each node once relevant messages have been received proceeds to the next protocol step. According to another embodiment, nodes send direct point-to-point messages to each other, and only use the P2P-Consensus-Message Routing channel for sending the final threshold signature back to the deterministic state.

Figure 7:
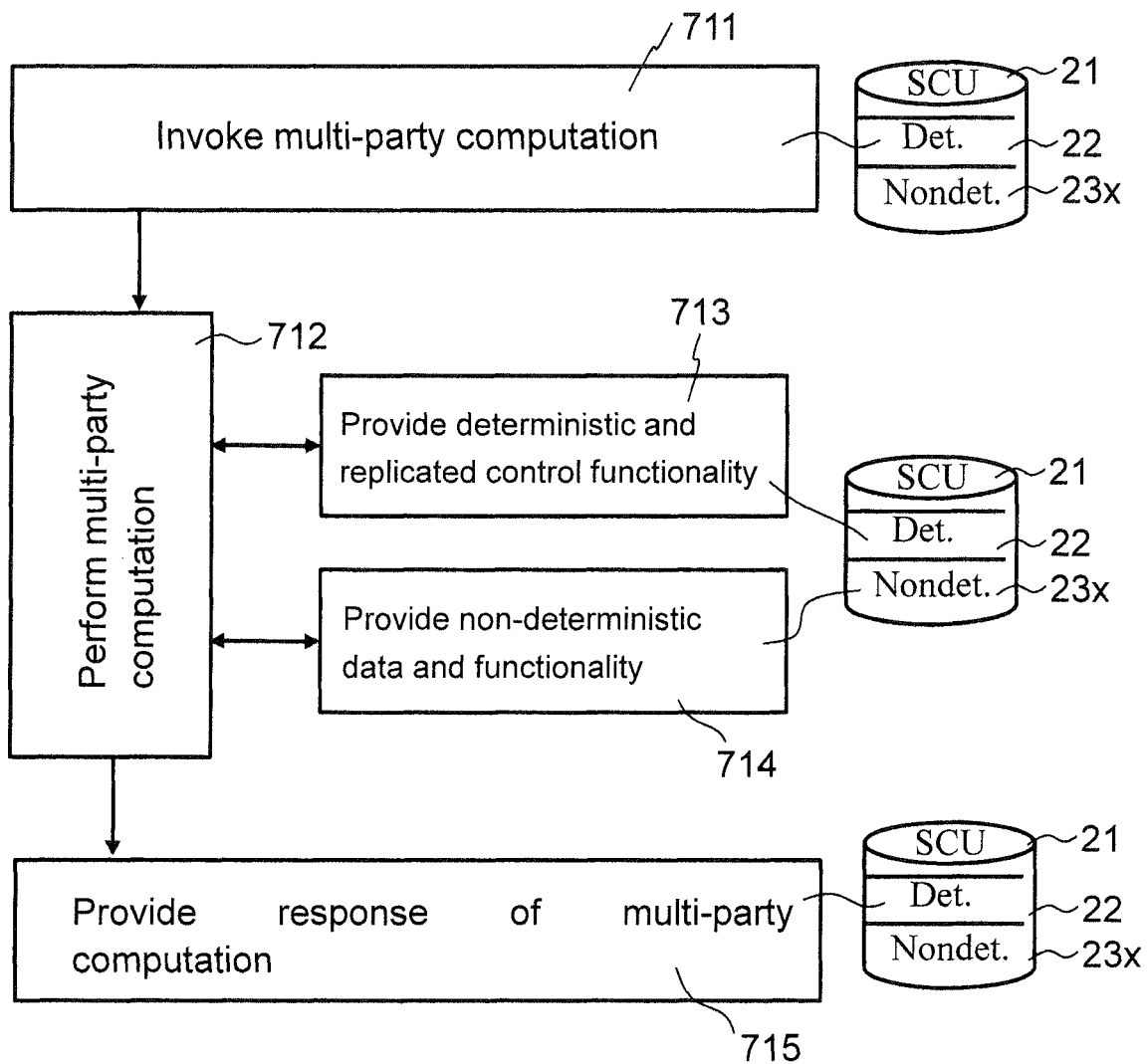
FIG. 7 shows a schematic flow chart of computer-implemented method for performing a multi-party computation in a distributed network.

FIG. 7 shows a schematic flow chart of a computer-implemented method for performing a multi-party computation in a distributed network comprising a replicated system computing cluster, e.g. the system computing clusters 200, 301 as shown in FIGS. 2 and 3 respectively. FIG. 7 also shows a corresponding system computational unit 21 comprising a deterministic subunit 22 and a non-deterministic subunit 23x in order to illustrate which parts of the system computational unit 21 is responsible for the execution of a corresponding method step.

At a step 711, the multi-party computation is invoked by a system call.

The system call may be invoked by an application computational unit, by a user of the network or by another system computational unit. The system call and corresponding input parameters of the system call are received by the deterministic subunits 22. In response to receiving a system call, the deterministic subunits 22 of the replicated system computing cluster trigger the multi-party computation.

At a step 712, the system computational units 21 of the corresponding replicated system computing cluster commonly perform the multi-party computation.

During the step 712, the non-deterministic subunits 23x and the deterministic subunits 22 cooperate together and provide different functionalities for the multi-party computation. More particularly, the deterministic subunits 22 provide, at steps 713, a deterministic and replicated control functionality for the multi-party computation. This includes in particular the provision of predefined common unit states on which the involved system computational units 21 have to agree on by means of the consensus mechanism. These common unit states may comprise in particular certain common checkpoints of the multi-party computation.

Furthermore, the non-deterministic subunits 23x provide, at steps 714, non-deterministic data for the multi-party computation and perform non-deterministic computations, i.e. data and computations which are individual to the respective nodes and do not need to be replicated across the nodes.

Then, at steps 715, the system computational units 21, more particularly, the deterministic subunits 22, provide a response to the system call comprising a result of the multi-party computation. This response has been run through the consensus mechanism performed by the system computational units and is hence a replicated state.

The control functionality provided by the deterministic subunits may include payment for invocation in step 711, charging for resources via step 713 of step 712, and refund of remaining balance in steep 715. It may also encompass management of resources and termination of the computation if the payment or storage, computation, or time bounds are exceeded.

Figure 8:
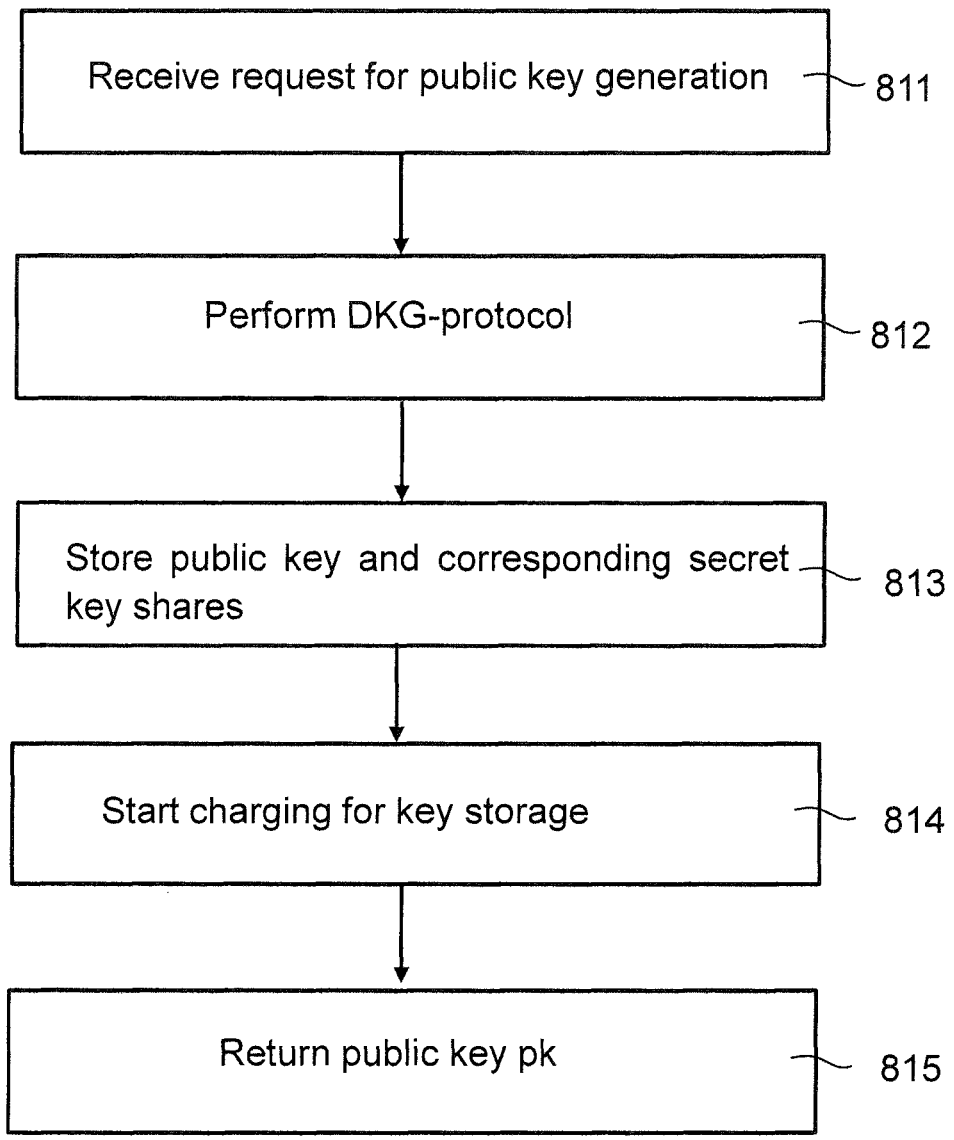
FIG. 8 shows a schematic flow chart of computer-implemented method for performing a distributed public key generation algorithm.

FIG. 8 shows a schematic flow chart of computer-implemented method for performing a distributed public key generation algorithm for generating a public verification key and a set of secret key shares corresponding to the public verification key. The method may be provided and performed by the system computational units as functionalities for the distributed network.

At a step 811, the distributed network receives as a system call a request for a public key generation. The request may be received in particular from an application computational unit or from a user of the distributed network.

At steps 812, the system computational units of the replicated system computing cluster perform a distributed key generation (DKG) protocol. The distributed key generation protocol generates a public verification key pk and a set of corresponding secret key shares ski. Each of the system computational units, more particularly the non-deterministic subunits, hold and store, at a step 813, one of the secret key shares. The public key pk may be stored by all of the system computational units, more particularly by their deterministic subunits. Then, at steps 814, the distributed network starts payments or in other words charging for the storage of the secret key shares and the corresponding public verification key.

Finally, at steps 815, the system computational units return the generated public verification key to the respective requestor, e.g. the respective application computational unit or the user.

Figure 9:
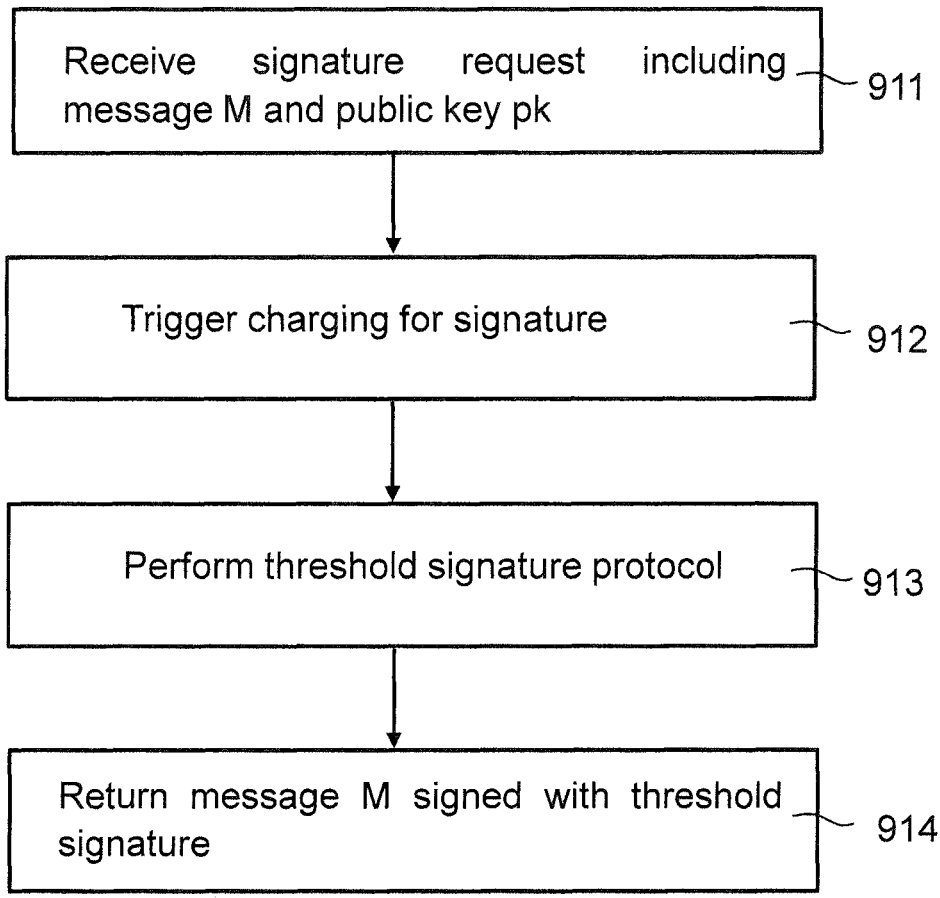
FIG. 9 shows a schematic flow chart of a computer-implemented method for performing a threshold signature algorithm.

FIG. 9 shows a schematic flow chart of a computer-implemented method for performing a threshold signature algorithm with respect to a public verification key, e.g. a public verification key that has been generated by a method as illustrated with reference to FIG. 8. The method may be provided and performed by the system computational units as functionalities for the distributed network.

At a step 911, the distributed network receives a system call comprising a signature request for performing a threshold signature on a message M. The signature request comprises the message M and public verification key pk. The request may be received in particular from an application computational unit or from a user of the distributed network. The respective application computational unit or the respective user may have received the public verification key previously by a method as illustrated in FIG. 8.

At a step 912, the system computational units trigger a payment or charging for the execution of the signature.

At steps 913, the system computational units of the replicated system computing cluster perform a threshold signature protocol. During this threshold signature protocol each of the non-deterministic subunits use its stored secret key shares ski corresponding the received threshold verification key pk for signing the message M.

Finally, at steps 914, the system computational units return the message M signed with the requested threshold signature corresponding to the received public verification key pk to the respective requestor, e.g. the respective application computational unit or the user.

Figure 10:
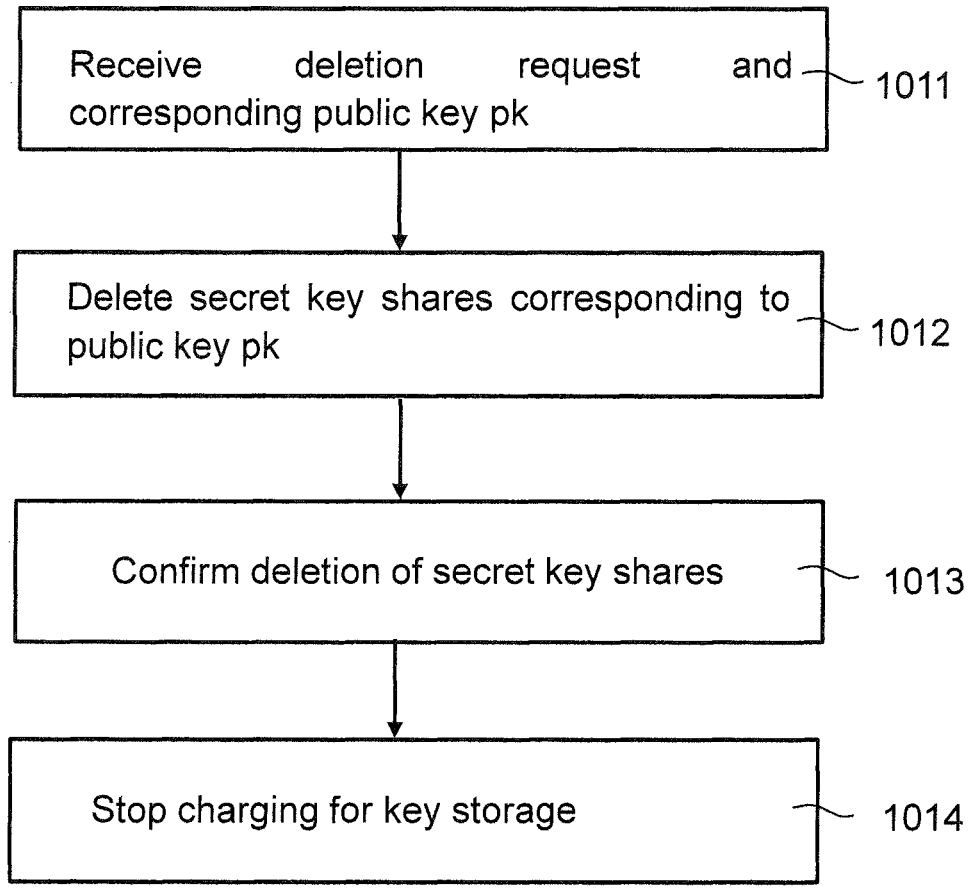
FIG. 10 shows a schematic flow chart of a computer-implemented method for performing a deletion of a set of secret key shares.

FIG. 10 shows a schematic flow chart of a computer-implemented method for performing a deletion of the set of secret key shares corresponding to a public verification key that has been requested formerly and that has been correspondingly registered by the replicated system computing cluster, e.g. a public verification key that has been generated by a method as illustrated with reference to FIG. 8.

At a step 1011, the distributed network receives a system call comprising a deletion request and a public verification key. The deletion request is intended to request a deletion of the secret key shares corresponding to the public verification key submitted with the deletion request. The deletion request may be received in particular from an application computational unit or from a user of the distributed network. The respective application computational unit or the respective user may have requested and received the public verification key previously, e.g. by a method as illustrated in FIG. 8.

At a step 1012, the system computational units delete the secret key shares which correspond to the received public verification key pk.

At a step 1013, the system computational units confirm the deletion of the secret key shares to the respective requestor, e.g. the respective application computational unit or the user.

Finally, at a step 1014, the system computational units stop the payments/charging for the storage of the secret key shares.

It should be noted that the start and the stop of the charging/payments for the key storage may also be triggered at other points in time than illustrated in FIGS. 8 and 10. As an example, the stop of the payments/charging may already be triggered directly after the receipt of the deletion request.

Figure 11:
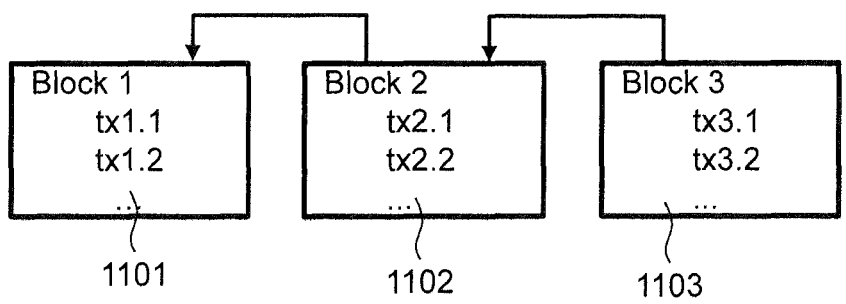
FIG. 11 illustrates the creation of blocks in distributed networks according to embodiments of the invention.

FIG. 11 illustrates the creation of blocks in distributed networks according to embodiments of the invention. The blocks may be in particular input blocks which are to be processed by the computational units of the replicas of a replicated computing cluster. The input blocks which are to be processed by the replicated computing cluster have been agreed upon by a consensus subset of the respective nodes/replicas of the replicated computing cluster.

In this exemplary embodiment three input blocks 1101, 1102 and 1103 are illustrated. Block 1101 comprises a plurality of transactions, namely the transactions tx1.1, tx1.2 and possibly further transactions indicated with dots. Block 1102 comprises also a plurality of transactions, namely the transactions tx2.1, tx2.2 and possibly further transactions indicated with dots. Block 1103 also comprises a plurality of transactions, namely the transactions tx3.1, tx3.2 and possibly further transactions indicated with dots. The input blocks 1101, 1102 and 1103 are chained together. More particularly, each of the blocks comprises a block hash of the previous block. This cryptographically ties the current block to the previous block(s).

According to embodiments the transactions may be in particular execution messages which are to be executed by the nodes/replicas of the replicated computing cluster.

According to embodiments, the input blocks 1101, 1102 and 1103 may be created by a proof-of-stake consensus-protocol.

However, it should be noted that the input blocks generated by the consensus component do not need to be chained together according to embodiments. Rather any consensus protocol that reaches some kind of consensus between the nodes on the selection and/or processing order of received messages may be used according to embodiments.

Figure 12:
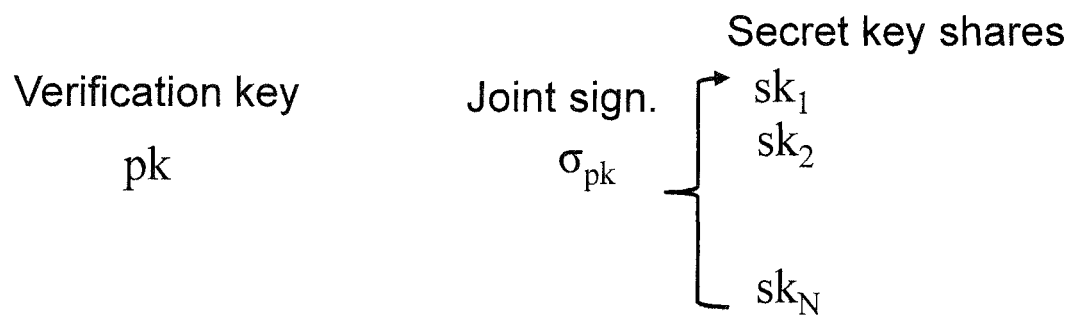
FIG. 12 shows an embodiment of keys which may be generated by a distributed threshold key generation protocol.

FIG. 12 shows an embodiment of keys 1210 which may be generated by a distributed threshold key generation protocol. The keys 1210 may be used by the system computational units of the replicated system computing cluster to sign messages on request of a user or an application computational unit. It is assumed for this example that a number N of system computational units participate in the distributed key generation protocol. Each of the N system computational units have a secret key share ski, wherein i=1, . . . , N. The N system computational units have generated jointly a common public verification key pk, wherein a predefined threshold, e.g. at least two thirds or a third of the system computational units need to use their secret key shares to create a joint signature σpk. The public verification key pk can then be used to verify the joint signature.

Figure 13:
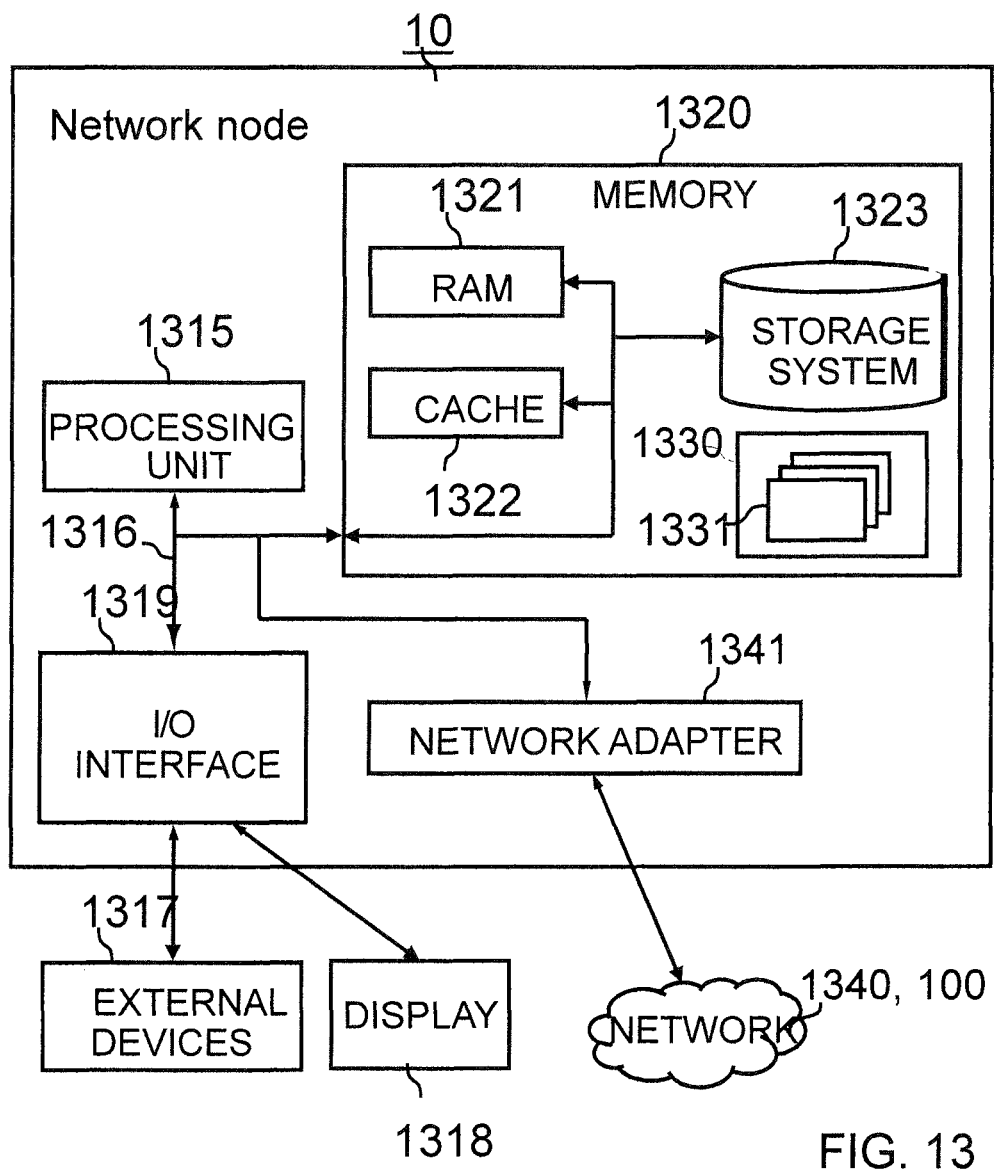
FIG. 13 shows an exemplary embodiment of a node according to an embodiment of the invention.

Referring now to FIG. 13, a more detailed block diagram of a network node 10 according to embodiments of the invention is shown, e.g. of the network 100 of FIG. 1. The network node 10 establishes a computing node that may perform computing functions and may hence be generally embodied as a computing system or computer. The network node 10 may be e.g. a server computer. The network node 10 may be configured to perform a computer-implemented method for operating a distributed network. The network node 10 may be operational with numerous other general purpose or special purpose computing system environments or configurations.

The network node 10 may be described in the general context of computer system-executable instructions, such as program modules, being executed by a computer system. Generally, program modules may include routines, programs, objects, components, logic, data structures, and so on that perform particular tasks or implement particular abstract data types. The network node 10 is shown in the form of a general-purpose computing device. The components of network node 10 may include, but are not limited to, one or more processors or processing units 1315, a system memory 1320, and a bus 1316 that couples various system components including system memory 1320 to processor 1315.

Bus 1316 represents one or more of any of several types of bus structures, including a memory bus or memory controller, a peripheral bus, an accelerated graphics port, and a processor or local bus using any of a variety of bus architectures.

Network node 10 typically includes a variety of computer system readable media.

System memory 1320 can include computer system readable media in the form of volatile memory, such as random access memory (RAM) 1321 and/or cache memory 1322. Network node 1310 may further include other removable/non-removable, volatile/non-volatile computer system storage media. By way of example only, storage system 1323 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1316 by one or more data media interfaces. As will be further depicted and described below, memory 1320 may include at least one computer program product having a set (e.g., at least one) of program modules that are configured to carry out the functions of embodiments of the invention.

Program/utility 1330, having a set (at least one) of program modules 1331, may be stored in memory 1320 by way of example, and not limitation, as well as an operating system, one or more application programs, other program modules, and program data. Each of the operating system, one or more application programs, other program modules, and program data or some combination thereof, may include an implementation of a networking environment. Program modules 1331 generally carry out the functions and/or methodologies of embodiments of the invention as described herein. Program modules 1331 may carry out in particular one or more steps of a computer-implemented method for operating a distributed network e.g. of one or more steps of the methods as described above.

Network node 10 may also communicate with one or more external devices 1317 such as a keyboard or a pointing device as well as a display 1318. Such communication can occur via Input/Output (I/O) interfaces 1319. Still yet, network node 10 can communicate with one or more networks 40 such as a local area network (LAN), a general wide area network (WAN), and/or a public network (e.g., the Internet) via network adapter 1341. According to embodiments the network 1340 may be in particular a distributed network comprising a plurality of network nodes 10, e.g. the network 100 as shown in FIG. 1. As depicted, network adapter 1341 communicates with the other components of network node 10 via bus 1316. It should be understood that although not shown, other hardware and/or software components could be used in conjunction with network node 10.

Aspects of the present invention may be embodied as a system, in particular a distributed network comprising a plurality of subnetwork, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

Aspects of the present invention are described herein with reference to flowchart illustrations and/or block diagrams of methods, networks, apparatus (systems), and computer program products according to embodiments of the invention.

Computer readable program instructions according to embodiments of the invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of networks, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While there are shown and described presently preferred embodiments of the invention, it is to be distinctly understood that the invention is not limited thereto but may be otherwise variously embodied and practiced within the scope of the following claims.

The invention claimed is:

1. A distributed network comprising one or more replicated computing clusters, wherein each of the one or more replicated computing clusters comprises a plurality of nodes, wherein
    the one or more replicated computing clusters comprise a replicated system computing cluster;
    each of the plurality of nodes of the replicated system computing cluster is configured to run a system computational unit;
    the system computational units of the replicated system computing cluster comprise deterministic subunits configured to perform a deterministic and replicated computation across the replicated system computing cluster and non-deterministic subunits for performing non-deterministic computations;
    the replicated system computing cluster is configured to perform a secure multi-party computation by
    invoking, by a system call, the system computational units for performing the multi-party computation;
    performing, by the system computational units, the multi-party computations;
    providing, by the deterministic subunits of the system computational units, a deterministic and replicated control functionality for the multi-party computation;
    providing, by the non-deterministic subunits of the system computational units, non-deterministic data for the multi-party computation;
    providing, by the system computational units, a response to the system call comprising a result of the multi-party computation; wherein
    the one or more replicated computing clusters comprise one or more replicated application computing clusters, wherein each of the plurality of nodes of the replicated application computing clusters is configured to run one or more application computational units for providing application services to users of the distributed network, wherein the one or more application computational units are configured to perform a deterministic and replicated computation across the respective replicated application computing cluster;
    the distributed network being further configured to
    invoke the system call by one of the one or more application computational units; and
    provide a unidirectional communication mechanism from the non-deterministic subunits to the deterministic subunits via a consensus mechanism.

2. A distributed network according to claim 1, wherein the deterministic subunits of the system computational units are configured to
    receive the system call;
    trigger the multi-party computation; and
    provide the response of the system call.

3. A distributed network according to claim 1, wherein the multi-party computation is a threshold signature computation.

4. A distributed network according to claim 3, wherein the threshold signature computation is a computation by means of a threshold Elliptic Curve Digital Signature Algorithm.

5. A distributed network according to claim 3, wherein the non-deterministic data comprises key-shares for the threshold-signature computation.

6. A distributed network according to claim 1, wherein the control functionality comprises
    controlling a message flow of the multi-party computation;
    controlling a charging for the multi-party computation; and/or
    controlling a response guarantee for the system call.

7. A distributed network according to claim 1, the distributed network being further configured to
    provide a unidirectional communication mechanism from the deterministic subunits to the non-deterministic subunits.

8. A distributed network according to claim 7, wherein the unidirectional communication mechanism is a push-mechanism.

9. A distributed network according to claim 7, wherein the unidirectional communication mechanism is a pull-mechanism.

10. A distributed network according to claim 1, wherein the system computational units are configured to
    perform a distributed public key generation algorithm for generating a public verification key and a set of secret key shares corresponding to the public verification key; and
    store the set of secret key shares by the non-deterministic subunits.

11. A distributed network according to claim 10, wherein the system computational units are configured to
- receive a signature request for performing a threshold signature, the signature request comprising a public verification key and a message;
- execute a threshold signature on the message with respect to the public verification key; and
- return the threshold signature.

12. A distributed network according to claim 10, wherein the system computational units are configured to
- receive a deletion request to perform a deletion of a set of secret key shares, the request comprising a public verification key; and
- delete the set of secret key shares corresponding to the public verification key.

13. A distributed network according to claim 1, further comprising
- invoking the system call by
  - a user of the distributed network; or
  - by another system computational unit.

14. A distributed network according to claim 1, wherein the replicated system computing cluster is embodied as a dedicated computing cluster for performing the multi-party computation, the dedicated computing cluster comprising only system computational units.

15. A distributed network according to claim 1, wherein the replicated system computing cluster is embodied as mixed computing cluster for performing the multi-party computation and for providing application services, wherein each of the plurality of nodes of the mixed computing cluster is configured to run the system computational unit and one or more application computational units.

16. A computer-implemented method for operating a distributed network comprising one or more replicated computing clusters, wherein each of the one or more replicated computing clusters comprises a plurality of nodes, wherein
- the one or more replicated computing clusters comprise a replicated system computing cluster;
- each of the plurality of nodes of the replicated system computing cluster is configured to run a system computational unit;
- the system computational units of the replicated system computing cluster comprise deterministic subunits configured to perform a deterministic and replicated computation across the replicated system computing cluster and non-deterministic subunits for performing non-deterministic computations;
- the one or more replicated computing clusters comprise one or more replicated application computing clusters, wherein each of the plurality of nodes of the replicated application computing clusters is configured to run one or more application computational units for providing application services to users of the distributed network, wherein the one or more application computational units are configured to perform a deterministic and replicated computation across the respective replicated application computing cluster;
- the method comprising
- performing, by the replicated system computing cluster a secure multi-party computation by
- invoking, by a system call, the system computational units for performing the multi-party computation;
- performing, by the system computational units, the multi-party computations;
- providing, by the deterministic subunits of the system computational units, a deterministic and replicated control functionality for the multi-party computation;
- providing, by the non-deterministic subunits of the system computational units, non-deterministic data for the multi-party computation; and
- providing, by the system computational units, a response to the system call comprising a result of the multi-party computation;
- invoking the system call by one of the one or more application computational units; and
- providing a unidirectional communication mechanism from the non-deterministic subunits to the deterministic subunits via a consensus mechanism.

17. A computer program product for operating a distributed network, the distributed network comprising one or more replicated computing clusters, wherein each of the one or more replicated computing clusters comprises a plurality of nodes, wherein
- the one or more replicated computing clusters comprise a replicated system computing cluster;
- each of the plurality of nodes of the replicated system computing cluster is configured to run a system computational unit;
- the system computational units of the replicated system computing cluster comprise deterministic subunits configured to perform a deterministic and replicated computation across the replicated system computing cluster and non-deterministic subunits for performing non-deterministic computations;
- the one or more replicated computing clusters comprise one or more replicated application computing clusters, wherein each of the plurality of nodes of the replicated application computing clusters is configured to run one or more application computational units for providing application services to users of the distributed network, wherein the one or more application computational units are configured to perform a deterministic and replicated computation across the respective replicated application computing cluster;
- the computer program product comprising a computer readable storage medium having program instructions embodied therewith, the program instructions executable by the system computational units to cause the replicated system computing cluster perform a secure multi-party computation by
- invoking, by a system call, the system computational units for performing the multi-party computation;
- performing, by the system computational units, the multi-party computations;
- providing, by the deterministic subunits of the system computational units, a deterministic and replicated control functionality for the multi-party computation;
- providing, by the non-deterministic subunits of the system computational units, non-deterministic data for the multi-party computation; and
- providing, by the system computational units, a response to the system call comprising a result of the multi-party computation;
- invoking the system call by one of the one or more application computational units; and
- providing a unidirectional communication mechanism from the non-deterministic subunits to the deterministic subunits via a consensus mechanism.

\* \* \* \* \*